E. H. PEARSALL.
CHANGEABLE SPEED GEARING.
APPLICATION FILED MAR. 21, 1914.
1,161,962.
Patented Nov. 30, 1915.
2 SHEETS—SHEET 1.
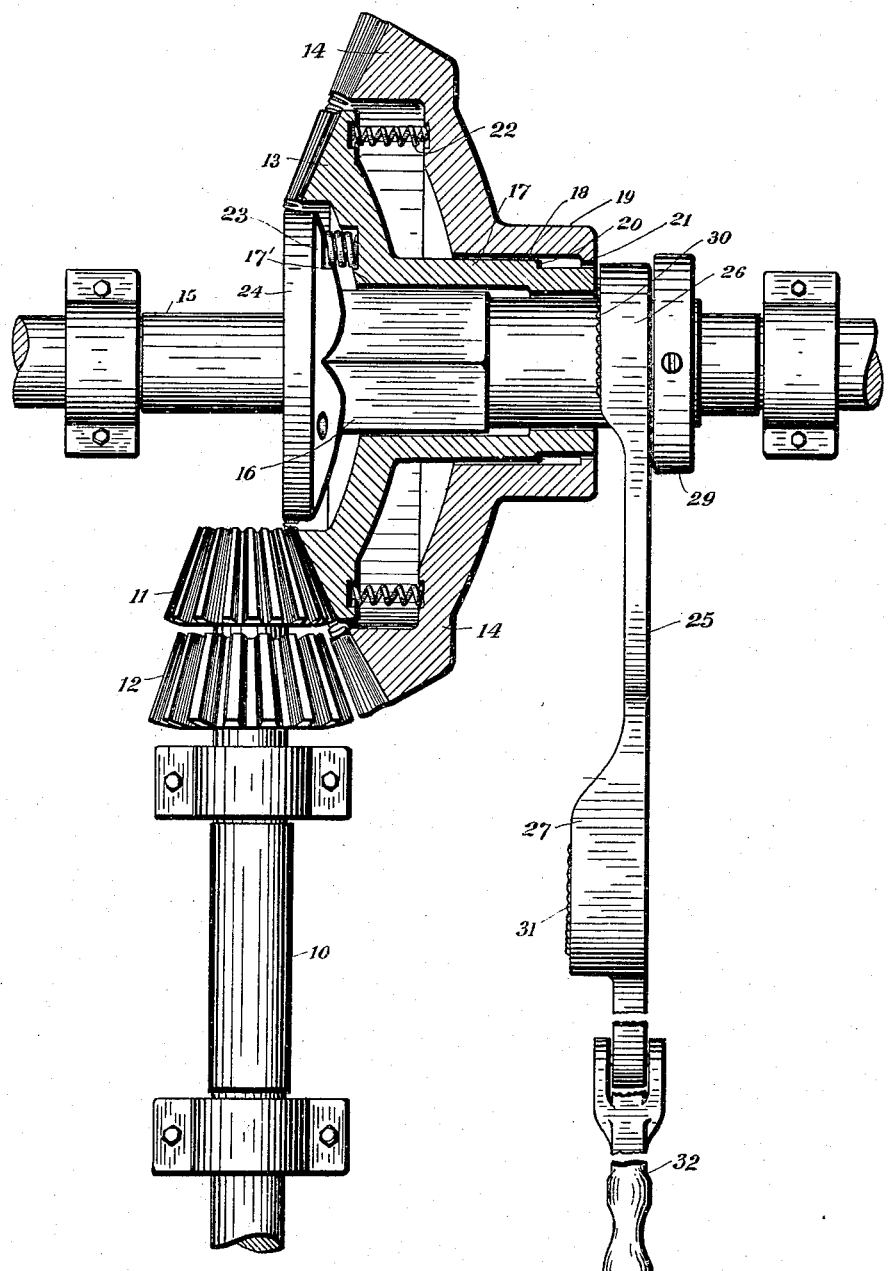
WITNESSES
INVENTOR
ATTORNEYS

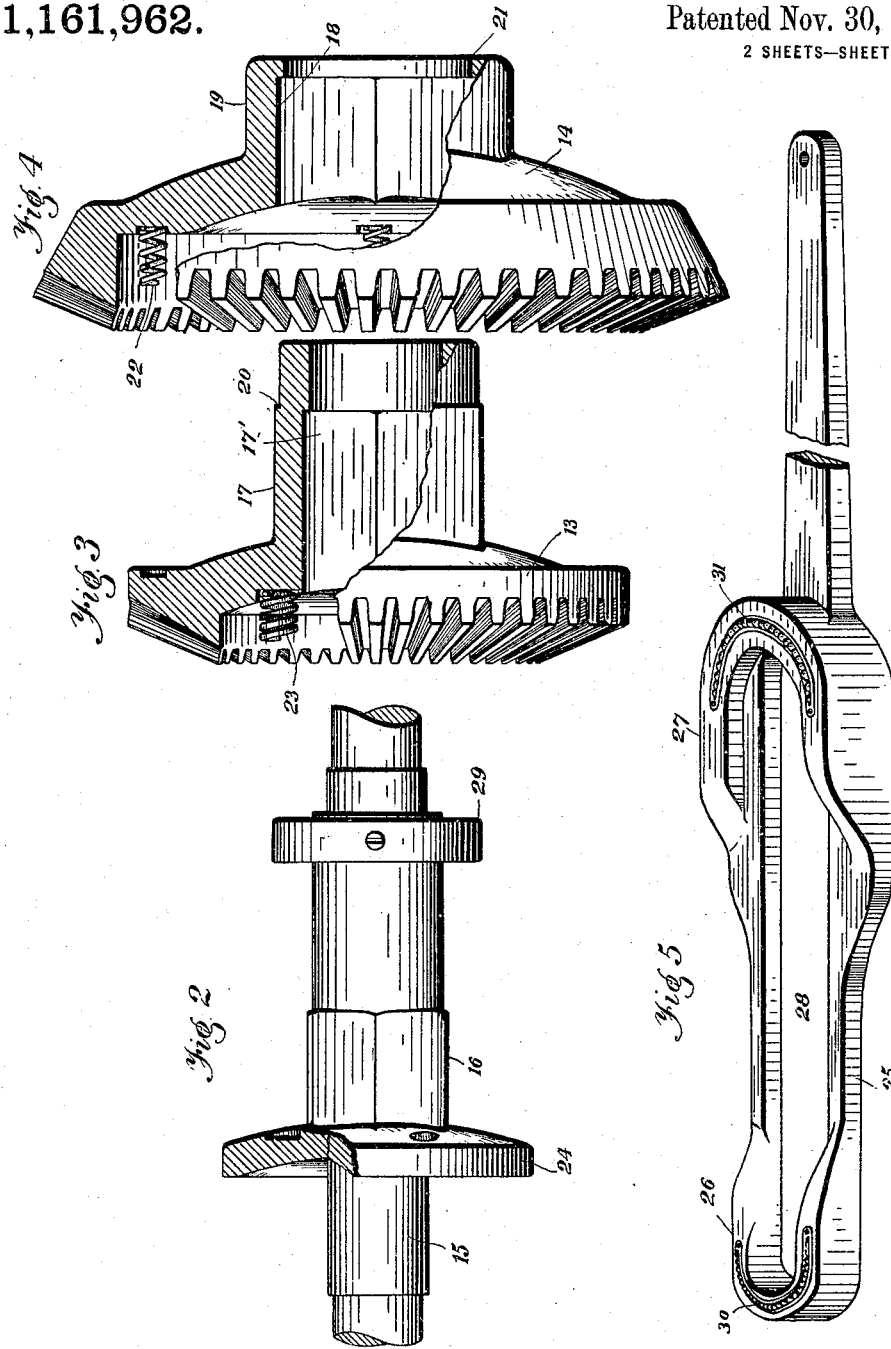

UNITED STATES PATENT OFFICE.

EARL H. PEARSALL, OF NEW CASTLE, PENNSYLVANIA.

CHANGEABLE-SPEED GEARING.

1,161,962.        Specification of Letters Patent.      Patented Nov. 30, 1915.

Application filed March 21, 1914. Serial No. 826,195.

*To all whom it may concern:*

Be it known that I, EARL H. PEARSALL, a citizen of the United States, and resident of New Castle, in the county of Lawrence and State of Pennsylvania, have invented certain new and useful Improvements in Changeable-Speed Gearing, of which the following is a specification.

One object of the invention is to provide means for transmitting power from a drive shaft to a driven shaft, and to conveniently change the speed ratio between the two.

It is also the purpose of my invention to provide a change speed gear capable of application to a motor vehicle, and to so construct the same that the gear shifting operation may be effected from some point within convenient reach of the motor vehicle driver.

In the accompanying drawings, Figure 1 is a power transmission device constructed in accordance with my invention, parts being shown in plan, and other parts in section. Fig. 2 is an elevation of a portion of the driven shaft provided with spring seats, shown partly in section. Fig. 3 is a view partly in elevation and partly in section of one of the gears on the driven shaft, and Fig. 4 is a similar view of another of said gears. Fig. 5 is a perspective view of the gear shifter.

Referring now to the drawings by numerals of reference, 10 designates a driving shaft which may be the power shaft of an engine to which are rigidly connected a plurality of alining pinion gears 11 and 12, adapted to alternately mesh with nested gears 13 and 14 on driven shaft 15, the plane of the axis of which intersects the plane of the axis of the drive shaft.

The driven shaft 10 is provided with an angular portion 16 to be received within angular bore 17' of hub 17 of gear 13, so that gear 13 is capable of independent sliding movement with respect to its shaft, but is held against independent rotative movement. The outer angular portion of hub 17 is received within the angular bore 18 of hub 19 of gear 14 mounted to slide upon the hub of inner gear 13 but rotative therewith, the sliding movement in one direction of the gear 14 with respect to the gear 13 being limited by shoulders 20 and 21 on the respective gear hubs. By reference to Fig. 1, it will be observed that sliding movement between gears 13 and 14 in one direction is opposed by springs 22 between gears 13 and 14, and by springs 23 between gear 13, and a head 24 comprising a spring seat fixed on the shaft 15, the springs 23 being stronger than the springs 22, so that sliding movement of the gear 14 may be effected independently of the gear 13.

Slidable transversely of shaft 15 is a gear selecting shifter consisting of a slotted bar 25 carrying gear-shifting cams 26 and 27 of varying depths, cam 26 being relatively shallow and cam 27 relatively deep. Bar 25 embraces and is movable on shaft 15, and is held in operative position by the abutment-forming collar 29. If desired, races 30 and 31 of anti-friction devices may be applied to the gear contacting faces of cams 26 and 27. Longitudinal movement of the shifter bar may be effected by any suitable means, for example, a lever 32 within convenient reach of the operator.

When the parts are assembled, as shown in Fig. 1, and the shifter 25 is moved into such position that the intermediate portion between the cams 26 and 27 is interposed between the collar 29 and the ends of the gear hubs, the springs 22 and 23 will be effective to move the gears 13 and 14 out of mesh with the gears 11 and 12, because the thickness of the bar 25 is less than the width of the space between the ends of the hubs and the collar 29. In this position the end of the hub of gear 13 will project slightly beyond the end of the hub of gear 14 so that should the shifter be moved to the position shown in Fig. 1, the cam 26 will engage hub 17 and shift the gear 13 in opposition to the springs 23 into mesh with the pinion 11 to drive shaft 15 at relatively high speed. If the gear shifter is moved to a neutral position, that is, with neither cam between the collar 29 and a hub, the springs 23 will force the gear 13 out of mesh with the pinion 11. On the other hand, if the sliding shifter is so moved as to bring cam 27 into engagement with the end of the hub 19, the gear 14 will be moved into mesh with the gear 12 without imparting movement to the gear 13 because the inner diameter of the cam 27 is greater than the outer diameter of the end of the hub 17 for gear 13, so that the cam 27 when moved into operative position will simply straddle hub 17. When gear 14 is in mesh with pinion 12, the shaft 15 will be driven at relatively low speed, the motion from the gear 14 being communicated to said shaft through the hub 17 and the gear 13 over which it slides.

I claim:

1. In a power transmission mechanism, a driving shaft and a driven shaft, pinions rigid on one of said shafts, concentric gears slidably mounted on the other of said shafts, said gears having independent sliding movement with respect to each other and into and out of mesh with the pinions but secured against independent rotary movement, a reciprocatory gear shifter, and gear actuating cams on said shifter—one for each gear.

2. In a power transmission mechanism, a shaft, pinions on said shaft, a second shaft, sleeved gears on the second shaft, the sleeved portions of the gears being angular in cross section and mounted to independently move into mesh with the pinions on the first mentioned shaft, and a slotted bar having offsets to contact with the hub ends of the gears to impart sliding movement thereto, the offset for one gear being adapted to straddle the hub of the other gear.

3. In a power transmission mechanism, a shaft, pinions on said shaft, a second shaft, concentric gears on the second shaft mounted to independently move into mesh with the pinions on the first mentioned shaft, and a slotted bar having offsets to contact with the hub ends of the gears to impart sliding movement thereto, the offset for the outer gear being adapted to straddle the hub of the inner gear.

4. The combination of a pair of concentric gears having hubs, and a gear shifter for said gears comprising a reciprocating bar having hub-engaging cam offsets.

5. The combination of a pair of concentric gears having hubs and a gear shifter for said gears comprising a bar having hub-engaging cam offsets, the depth of one offset being greater than that of the other.

6. The combination of a pair of concentric gears having hubs, and a gear shifter for said gears comprising a slotted bar having hub-engaging cam offsets.

7. The combination of two sliding gears having hubs, the hub of one being sleeved upon the hub of the other, and a sliding gear shifter having arcuate offsets, the diameter of the offset for the outer gear being greater than the diameter of the offset for the inner gear.

8. In a power transmission mechanism, a driving shaft, a driven shaft, pinions on one of said shafts and gear wheels complementary with the pinions and rotatable with and slidable on the other shaft with said gear wheels arranged adjacent to each other, an abutment on the gear-carrying shaft in advance of the foremost gear wheel, springs interposed between the abutment and the foremost gear wheel for opposing movement of the latter in direction to engage its pinion, springs interposed between the foremost gear wheel and the other gear wheel for opposing movement of the latter in direction to engage its pinion, the foremost gear wheel comprising an abutment for the last named springs, and gear-wheel shifting means.

In testimony whereof I affix my signature in presence of two witnesses.

EARL H. PEARSALL.

Witnesses:
A. M. BURNS,
W. P. STAMBAUGH.

Copies of this patent may be obtained for five cents each, by addressing the "Commissioner of Patents, Washington, D. C."